April 23, 1940.  J. M. SINCLAIR  2,197,883

METHOD OF MAKING SHAFT JOURNALS

Filed Sept. 6, 1938

INVENTOR
JOHN M. SINCLAIR
by J.H.Weatherford
Atty

Patented Apr. 23, 1940

2,197,883

UNITED STATES PATENT OFFICE 2,197,883

METHOD OF MAKING SHAFT JOURNALS

John Morton Sinclair, Memphis, Tenn., assignor to Layne and Bowler, Incorporated, Memphis, Tenn., a corporation of Delaware Application September 6, 1938, Serial No. 228,604

2 Claims. (Cl. 29—149.5)

This invention relates to means and methods for anchoring a journal sleeve on a shaft.

That portion of a shaft which is journalled in a bearing is usually of less diameter than the remainder of the shaft because of the necessity of additional turning and finishing whereas it is often advantageous and desirable that such portion of the shaft should be of greater diameter. It also happens often that the journalled portion of the shaft could advantageously be made of a different material from the body of the shaft, but whether made of the same or different material, the bearing member should be so tightly secured as to have no movement either longitudinally or rotationally about the shaft. This may obviously be accomplished by placing around the shaft a heated sleeve, which sleeve on cooling shrinks and tightly grips the shaft. This construction, however, is extremely difficult where the sleeve is placed at any distance from the end of the shaft unless the sleeve has such great thickness that it will retain its heat while being slid to place along the shaft, the usual result with thin sleeves being that a large number stick before they can be placed in correct position and it is necessary to cut them off and try again.

The objects of the present invention are:

To provide an enlarged journal section on a shaft.

To provide means for securing and rigidly anchoring a journal sleeve on a shaft; and To provide a method for placing and securing a journal sleeve around the shaft.

The means and methods by which the foregoing and other objects are accomplished, and the manner of their accomplishment will readily be understood from the following specification on reference to the accompanying drawing, in which.

Figure 1:
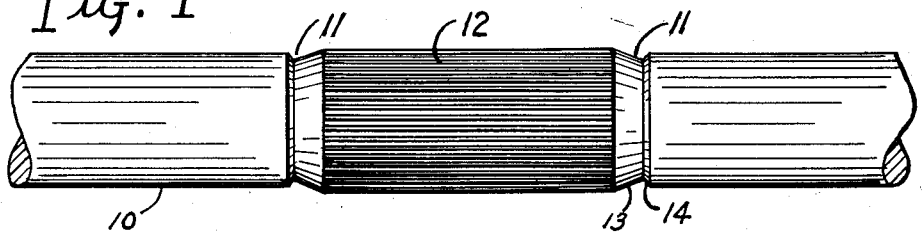
Fig. 1 is a side elevation of a portion of a shaft prepared for the reception of the journal sleeve.
Figure 2:
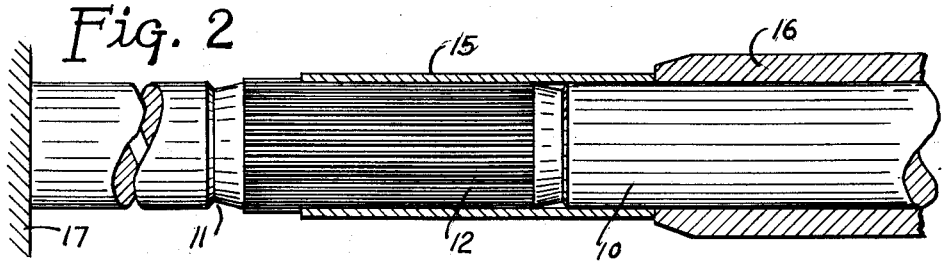
Fig. 2 is a similar side elevation showing a journal sleeve being forced into position on the shaft, the sleeve being shown in section.
Figure 3:
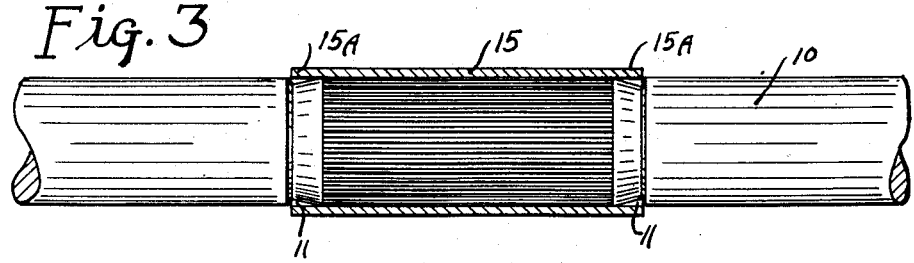
Fig. 3 is a side elevation showing the sleeve in place on the shaft, the sleeve being in section.
Figure 4:
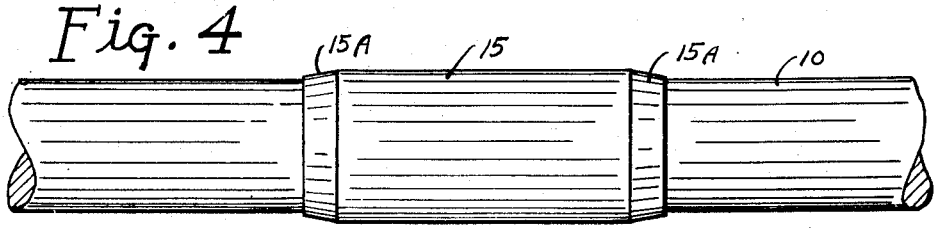
Fig. 4 is a side elevation showing the sleeve in elevation and in place with the ends swedged.

Referring now to the drawing in which the various parts are indicated by numerals;

10 is a shaft having circumferential grooves 11 therearound with that portion 12 of the shaft which lies between the grooves knurled, the ridges of the knurling extending longitudinally along the shaft, preferably in exact parallelism with the axis of the shaft. The grooves 11 preferably have a frusto-conical portion 13 converging in opposite directions from the knurled portion 12 and terminating in relatively abrupt shoulders 14.

In preparing the shaft, grooves are turned in the shaft at such distances apart that the ends of the sleeve to be used will abut the shoulders 14 of the groove when the work is completed. That portion of the shaft lying between the grooves is then knurled in usual and well known manner with a knurled wheel or roller having full straight cut teeth, the surface of the shaft being alternately depressed and extruded, forming closely spaced ridges and grooves, the taper of the circumferential grooves continuing to the tops of the ridges formed in the knurling. If preferred the knurling may be done before the circumferential grooving.

15 is a sleeve of such material as it may be desired to use for the journal, this sleeve being of a length to provide a straight portion of desired length and in addition thereto tapered end portions. The interior diameter of the sleeve is made to have a sliding fit on the shaft, whereby such interior diameter is less than the diameter of the shaft over the ridges, and these ridges must expand the sleeve, be compressed to their original position or be imbedded in part in the sleeve. The sleeve 15 is forced into place over the knurling 12 as by the hollow plunger 16 of a hydraulic press, the end of the shaft being placed against an abutment 17 for such purpose. As the sleeve 15 is forced in to position, it apparently in part compresses the ridges of the knurling and in part is longitudinally grooved by these ridges, anchoring the sleeve against possibility of rotational, and substantially against longitudinal, displacement. The sleeve 15 is forced into position with its ends 15—A overlying the grooves 11 and thereafter these ends are compressed by internally tapered sleeves into the grooves. After placing, the exterior surface of the sleeve is finished by turning and/or grinding to the exact outside dimensions desired.

It will be understood that it is not necessary in all cases to groove the shaft and compress the ends of the sleeve in such groove, but such compression and the tapering resulting is advantageous in cases such as in deep well pumps where the shaft is lowered through bearings already in place and the taper of the journals guide them into place in the bearings.

In the instant construction in which these sleeves are used both the shaft and sleeve are of stainless steel, but it will be understood that they may be of dissimilar metals, selected as may be most advantageous to meet conditions which may exist or arise.

I claim:

1. The method of forming a shaft journal, which includes forming extruded ridges around said shaft, said ridges extending longitudinally along the shaft and the end portions thereof converging toward said shaft, forming shallow circumferential grooves at the opposite ends of said knurling, said grooves each having a bottom converging away from said knurling and terminating in an abrupt shoulder; forcing a sleeve, having a sliding fit with said shaft and of length to overlie said ridges and said grooves from shoulder to shoulder, longitudinally along said shaft into position over said knurling and said grooves whereby to secure said sleeve by compression of said ridges, by embedment of said ridges in said sleeve and by stretching of said sleeve, said sleeve having a uniform wall thickness substantially equal to the maximum groove depth, and coning the end portions of said sleeve into said grooves with the ends of said sleeve substantially flush with said shaft, whereby to provide guiding approach portions to said journal.

2. The method of forming a shaft journal as set out in claim 1 which includes finishing the exterior of said sleeve substantially concentric with said shaft.

JOHN MORTON SINCLAIR.